3,179,562
TREATMENT OF DIABETES WITH ALPHA,ALPHA SUBSTITUTED ACETIC ACID DERIVATIVES
Howard E. Hoffman and Marvin Paulshock, Wilmington, Del., assignors to E. I. du Pont de Nemours and Company, Wilmington, Del., a corporation of Delaware
No Drawing. Filed Aug. 23, 1961, Ser. No. 133,326
5 Claims. (Cl. 167—55)

This invention relates to the treatment of diabetes and to compositions useful for such treatment.

No assertion or promise is made herein for the cure of any disease. Rather, the present invention is directed to the treatment and alleviation of the characteristics of diabetes. As insulin does not cure diabetes, but aids in the correction of metabolic malfunction associated therewith, so does practice of the present invention assist to accomplish metabolic adjustment requisite with diabetes treatment.

The search has continued for many years for a substitute or supplement for insulin in the treatment of diabetes. However, insulin must be administered by injection with all its attendant difficulties and inconveniences. The need exists for an insulin substitute or supplement which is capable of effective and convenient administration by the oral route.

According to the present invention, treatment of diabetes is carried out by the use of non-toxic non-corrosive alpha,alpha substituted acetic acid derivatives. The words "non-toxic" and "non-corrosive" are used in their pharmaceutical sense to mean non-injurious to the recipient.

According to this invention, oral administration of the alpha,alpha substituted acetic acid derivative compound will be at a daily rate from about 25 milligrams to 10 grams or even higher as needed. A preferred dosage ranges from 0.1 to 5 grams per day. Administration can be spread out over several times per day, as with meals, or otherwise as convenient. The exact dosage within the recited range will depend on the severity of the affliction, upon concurrent treatments, the physiology of the recipient, other attendant circumstances, and the nature of the effect desired.

The alpha,alpha substituted acetic acid derivative compound can be used according to this invention in a composition which comprises the active compound together with an inert non-toxic pharmaceutical carrier. The composition can take the form of tablet, powder, capsule or other dosage forms. The active alpha,alpha-dihaloacetic acid derivative compound can be admixed with solid diluents and/or tableting adjuvants such as corn starch, lactose, talc, stearic acid, magnesium stearate, sugar, gums, or the like.

Any of the tableting materials used in pharmaceutical practices can be employed where there is no incompatibility with the alpha,alpha substituted acetic acid derivative compound. The material can be tableted or put in other dosage form with or without adjuvants. Alternatively the active compound with or without a further adjuvant can be placed in a conventional pharmaceutical capsule, such as a gelatin capsule, and be administered in that form.

In yet another embodiment, the compositions of this invention will include the presence of the active ingredient in a powder packet, or the composition can be prepared in the form of a suspension in a material in which the active ingredient is not soluble.

In the case where the active ingredient of this invention is a liquid, it can be included in a conventional capsule, or with one of the other adjuvants above or well known in the art to form a suitable tablet, syrup, suspension, dispersion, solution or other convenient form suitable for oral administration.

The compositions of this invention can be prepared by conventional procedures and can contain, in addition to one or more of the active ingredients, and in addition to the inert adjuvant or adjuvants, one or more other metabolically, therapeutically or nutritionally beneficial ingredients, including sedatives, diuretics, and vitamins such as ascorbic acid.

The novel compositions of this invention contain from about 10 milligrams to about 5 grams of alpha,alpha-substituted acetic derivative compound. A preferred composition will contain from about 25 milligrams to about one gram of such compound. Ordinarily, since it will be desired to administer the active compound according to this invention in fairly concentrated form, i.e. with only so much pharmaceutical carrier as is necessary or convenient to assist in administration, the active component will constitute under most circumstances a fairly high proportion of the total composition. For example, the active compound will normally constitute from about 20 percent to 98 percent by weight of the total composition, although extreme dilution or extreme concentration can exist in compositions having from as little as 1 percent active ingredient to 99 percent or higher active ingredient.

The concept of the present invention includes the use in the inventive method and composition any compound which under physiological conditions, produces the acetate ion substituted as indicated below. It is this ion, which can be introduced into the system in the form of any suitable non-toxic, non-corrosive precursor compound which breaks down in the body to form this ion, which has the hypoglycemic activity characteristic of the present invention.

The substituents on the alpha carbon of the acetic acid derivative compound can be chlorine or fluorine, or any mixed combination of these. Suitable compounds of this invention include those represented by the following formula:

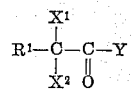

where
R$^1$ is hydrogen, methyl or fluorine;
X$^1$ and X$^2$ can be the same or different and are chlorine or fluorine; and
Y is selected from the group consisting of (1) OM where M is a non-toxic ion, including alkali metal and alkaline earth metal ions, such as Na$^+$, K$^+$, Ca$^{++}$, Mg$^{++}$, NH$_4^+$, substituted ammonium where the substituent is mono- or di-lower alkyl radical of 1–4 carbons, and ethylene di-ammonium; (2) OR where R is benzyl, straight or branched alkyl of 1–12 carbons, alkenyl of 2–12 carbons, or cyclic alkyl of 5–8 carbons; the benzyl, alkyl, alkenyl and cycloalkyl group can be substituted with one or more groups such as hydroxy or dialkylamino with the total number of carbon atoms in R, as just described, being no more than 12; polyhydroxy substituted radicals are included, for example, a glycerol or a suitable sugar residue, which can have one or more of the hydroxy groups esterified with the substituted acetate moiety; suitable sugars are, for example, monosaccharides such as aldo- and keto-pentoses, and -hexoses, or disaccharides such as sucrose, with the total number of carbon atoms in the polyhydroxy moiety being no more than 12 before esterification with the substituted acetate moiety; and (3) NHR$^2$ where R$^2$ is hydrogen or an amino acid radical thus including such preferred compounds as N-dichloroacetamide, N-dichloroacetyl serine and N-dichloroacetyl methionine. Other suitable salts are those formed with aminoalcohols (for example, choline, and diethylaminoethyl alcohol); basic amino acids such as lysine and arginine; and esters of amino acids such as glycine ethyl ester.

Preferred compounds according to this invention are alpha,alpha-dichloroacetates of the above formula where Y is $NH_2$; OR where R is methyl, ethyl or diethylaminoethyl; OM where M is a common cation ($Na^+$, $K^+$, $NH_4^+$, $Ca^{++}$) or a basic amino acid cation particularly lysine cation.

It is advantageous to use a mixture of the above compounds to provide proper physiological balance. For example, a physiological mixture of $Na^+$ and $K^+$, or $Na^+$, $K^+$ and $Ca^{++}$ for M (a balanced cation mixture) can beneficially be used.

Because of its low pH and known corrosiveness to epithelial tissues, 2,2-dichloroacetic acid itself should not be used unless suitably buffered, say to a pH above about 4, with any non-toxic buffering agent.

In contrast with monochloroacetates and monofluoroacetates, the compounds within this invention are low in animal toxicity. Another advantage is the greater persistence of action compared with some commercially available antidiabetics. For example, maximum effect using the present invention is later and this effect persists for a greatly extended period of time compared with Orinase. Combined treatment according to this invention together with known oral antidiabetic agents such as Orinase gives outstanding results with greater than additive effects being noted under some circumstances.

In animal treatment, such as dogs, the material can be mixed with the feed or added to the drinking water. Daily dosage of 100 milligrams to 5 grams per kilogram of body weight is satisfactory.

This invention will be further understood by reference to the following examples:

*Example 1*

One hundred (100) milligrams of sodium dichloroacetate, 2½ milligrams of gelatin, 2½ milligrams of magnesium stearate and 100 mg. of starch are mixed and formed into a tablet by a conventional tableting machine. The tablet is then surface coated with an artificial cherry-flavored sweet syrup. Normal blood glucose is obtained for extended periods in cases of hyperglycemia related to diabetes mellitus by ingestion of from 5 to 20 tablets daily.

*Example 2*

A plurality of unit capsules are prepared by filling standard two-piece hard gelatin capsules weighing about 50 milligrams each (#0) with 100 milligrams of powdered DL-lysine dichloroacetate. Glycosuria can be maintained within normal limits in cases of diabetes mellitus by ingestion of 5 to 20 capsules daily.

*Examples 3–23*

Examples 1 and 2 are repeated, substituting the following compounds for those of those examples with equally satisfactory results:

Example No.     Compound
- 3 _____ Sodium dichloroacetate.
- 4 _____ Calcium difluoroacetate.
- 5 _____ Potassium chlorodifluoroacetate.
- 6 _____ Ammonium trifluoroacetate.
- 7 _____ Ammonium-alpha,alpha-dichloropropionate.
- 8 _____ DL-lysine dichloroacetate.
- 9 _____ N-dichloroacetyl-DL-alanine, sodium salt.
- 10 ____ N-difluoroacetyl-DL-methionine.
- 11 ____ N-dichloroacetyl ethyl glycinate.
- 12 ____ N-difluoroacetyl-DL-serine.
- 13 ____ N-diethylaminoethyl difluoroacetate.
- 14 ____ Ethyl dichloroacetate.
- 15 ____ Isopropyl dichlorofluoroacetate.
- 16 ____ Cyclohexyl dichloropropionate.
- 17 ____ Dichloroacetyl-D-glucose.

Example No.:     Compound
- 18 ____ Glyceryl tri(alpha-fluoro-alpha-chloropropionate).
- 19 ____ Difluoroacetamide.
- 20 ____ Dichlorofluoroacetamide.
- 21 ____ Alpha,alpha-dichloropropionamide.
- 22 ____ D-glucose, pentadichloroacetate.
- 23 ____ D-mannose, pentadifluoroacetate.

*Example 24*

A liquid syrup for oral administration is prepared by mixing one part by weight of sodium dichloroacetate and 20 parts of raspberry acacia syrup. Daily oral administration of from 5 to 25 teaspoonfuls of the mixture reduces the hyperglycemia of diabetes mellitus to normal values.

*Example 25*

An effective hypoglycemic oral suspension is prepared by admixing 1 part by weight of dichloroacetamide, 1 part by weight of Acacia N.F., 5 parts by weight of Cocoa Syrup N.F., 93 parts by weight of water. The hyperglycemia of diabetes mellitus can be controlled by 5 to 25 teaspoonfuls daily.

*Examples 26–27*

Examples 24 and 25 are repeated, substituting the following compounds for that used in those examples with equally satisfactory results:

Example No.:     Compound
- 26 _____ Dimethylamine dichloroacetate.
- 27 _____ Methyl difluoroacetate.

The invention claimed is:

1. The method of treating diabetes mellitus comprising orally administering to a recipient having said diabetes mellitus from 25 milligrams to 10 grams per day of a compound selected from the group consisting of compounds of the formula

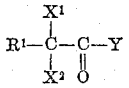

where
- $R^1$ is selected from the group consisting of hydrogen, methyl, and fluorine;
- $X^1$ and $X^2$ are each selected from the group consisting of chlorine and fluorine; and
- Y is selected from the group consisting of $NH_2$; OR where R is selected from the group consisting of methyl, ethyl, and diethylaminoethyl; and OM where M is a cation selected from the group consisting of sodium, potassium, calcium, quaternary ammonium, and lysine.

2. The method of claim 1 where said compound is sodium dichloroacetate.

3. The method of claim 1 where said compound is dichloroacetamide.

4. The method of claim 1 where said compound is DL-lysine dichloroacetate.

5. The method of treating diabetes mellitus in a lower animal comprising orally administering to said animal from 100 milligrams to 5 grams per kilogram of body weight per day of a compound selected from the group of compounds of the formula

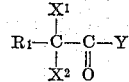

where
- $R^1$ is selected from the group consisting of hydrogen, methyl, and fluorine;
- $X^1$ and $X^2$ are each selected from the group consisting of chlorine and fluorine; and
- Y is selected from the group consisting of $NH_2$; OR where R is selected from the group consisting of methyl, ethyl, and diethylaminoethyl; and OM where M is a cation selected from the group consisting of sodium, potassium, calcium, quaternary ammonium, and lysine.

References Cited in the file of this patent

FOREIGN PATENTS 810,461  Great Britain _____ July 8, 1955

OTHER REFERENCES

Chemical Abstracts, vol. 35, page 4352, 1941 (citing Bergmann et al., J. Am. Chem. Soc., vol. 63, pages 1436–9, 1941).

Current List of Medical Literature (1), vol. 26, listing 5412, 1954 (citing Miller et al., J. of the Am. Veterinary Medical Assoc., vol. 124:925, pages 291–4, April 1954).

Current List of Medical Literature (2), vol. 27, listing 3771, 1955 (citing Lipsky et al., Journal of Clinical Investigation, vol. 33 (9), pages 1269–76, September 1954).

Chemical Abstracts (II), vol. 41, entry 4024g, 1947 (citing Drucker, Arkiv. Kemi. Mineral Geol., A 22, No. 21, 17 pages, 1946).

Excerpta Medica, Sect. II, vol. 8, entry 774, 1955 (citing Elliott et al., Arch. Biochem. Biophys., vol. 49, No. 2, pages 389–395, 1954).